United States Patent [19]

Summers

[11] Patent Number: 5,051,232

[45] Date of Patent: Sep. 24, 1991

[54] POWDERED METAL MULTIPLE PIECE COMPONENT MANUFACTURING

[75] Inventor: Hayward P. Summers, Plymouth, Mich.

[73] Assignee: Federal-Mogul Corporation, Southfield, Mich.

[21] Appl. No.: 465,830

[22] Filed: Jan. 16, 1990

[51] Int. Cl.⁵ .............................................. B22F 3/26
[52] U.S. Cl. ...................................... 419/27; 419/28; 419/38
[58] Field of Search .............................. 419/28, 38, 27

[56] References Cited

U.S. PATENT DOCUMENTS

| | | | |
|---|---|---|---|
| 4,569,109 | 2/1986 | Fetouh | 29/165.5 A |
| 4,693,139 | 9/1987 | Mukai et al. | 74/579 E |
| 4,923,674 | 5/1990 | Weber | 419/28 |

FOREIGN PATENT DOCUMENTS

| | | |
|---|---|---|
| 167320 | 1/1986 | European Pat. Off. . |
| 304162 | 2/1989 | European Pat. Off. . |
| 154505 | 12/1980 | Japan . |
| 141301 | 8/1983 | Japan . |
| 367462 | 9/1974 | United Kingdom . |

OTHER PUBLICATIONS

Tsumuti et al., "Application of Powder Forging to Automotive Parts" MPR Nov. 1984, pp. 629–637.

Primary Examiner—Stephen J. Lechert, Jr.
Assistant Examiner—Leon Nigohosian, Jr.
Attorney, Agent, or Firm—Lawrence J. Shurupoff

[57] ABSTRACT

The separation of two or more forged powder metal components is facilitated by forming a compacted and sintered powder metal preform with at least one slit that separates the component pieces. An anti-bonding agent such as graphite is introduced into the slit and the preform is then forged to final shape. The anti-bonding agent prevents the complete bonding of the powder metal pieces to each other thereby facilitating separation of the pieces at the slit. This method is particularly suited for the manufacture of piston connecting rod assemblies of the type including a connecting rod and cap.

20 Claims, 4 Drawing Sheets

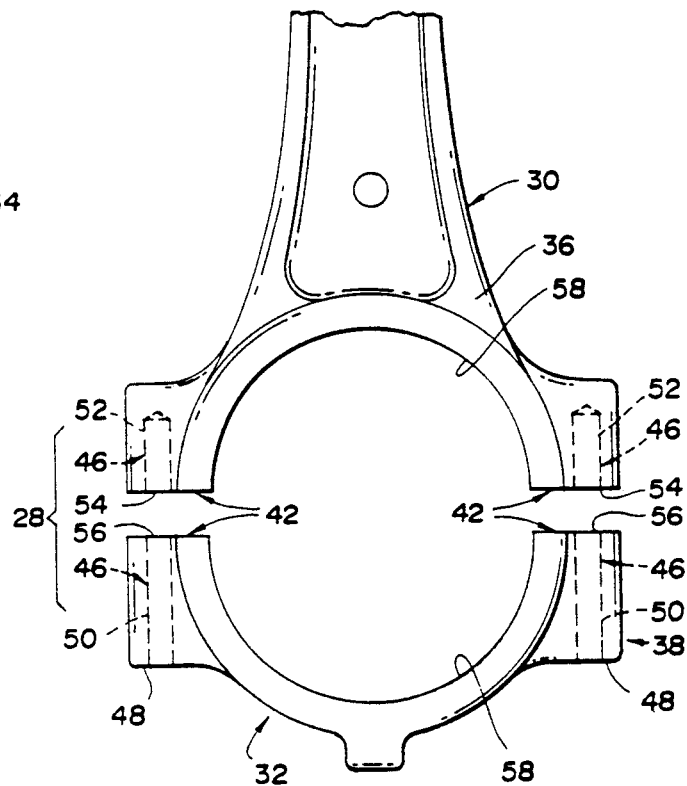
Fig. 3
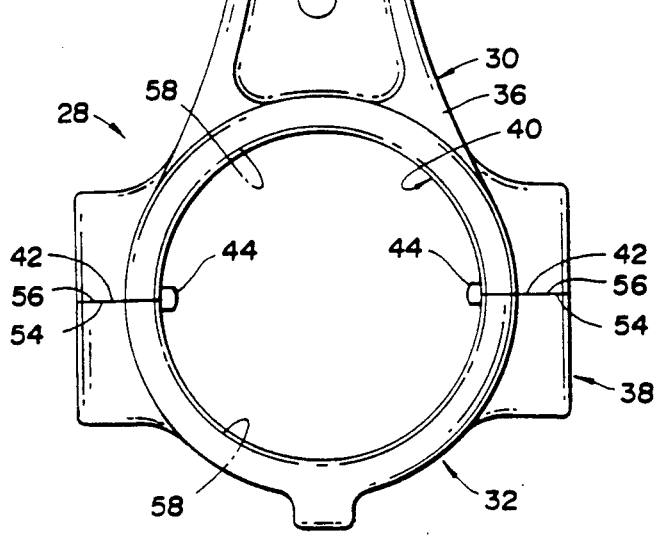
Fig. 2
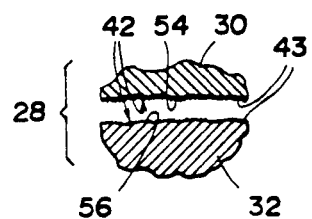
Fig. 4
Fig. 5

POWDERED METAL MULTIPLE PIECE COMPONENT MANUFACTURING

TECHNICAL FIELD

This invention relates to manufacturing of multiple piece powdered metal components and has particular utility in manufacturing matched piston connecting rods and caps.

BACKGROUND ART

Powdered metal components are conventionally manufactured by making a preform which is compacted and then sintered prior to a forging operation. After the forging, any necessary machining of the powdered metal component is performed to complete the manufacturing. Such conventional powdered metal manufacturing has previously been utilized to make piston connecting rod assemblies of the type including a connecting rod and cap. The rod has one end that connects to an associated piston and the cap cooperates with the rod to provide another end that connects the assembly to the crankshaft of the engine in which the piston operates. Such manufacturing of piston connecting rod assemblies whether made from powdered metal forgings or from solid metal forgings requires accuracy in matching of the connecting rod and cap so that a round crankshaft bearing surface cooperatively defined thereby has the required tolerance to permit effective operation for the required lifetime of use.

In order to provide accurate matching of piston connecting rods and caps, the prior art has utilized a fracturing operation for separating a cap from an associated rod at generally diametrically opposite locations with respect to the crankshaft opening cooperatively defined by the cap and the rod. This fracturing provides matched rod and cap surfaces that are subsequently engaged and secured to each other by a pair of cap bolts on opposite sides of the crankshaft opening. Examples of this fracturing are disclosed in U.S. Pat. Nos.: 2,553,935 Parks et al ; 3,818,577 Bailey et al.; and 3,994,054 Cuddon-Fletcher, deceased, et al. Such fracturing provides accurate matching of the engaged cap and rod surfaces without the necessity of any high tolerance machining. However, the fracturing requires considerable energy and care must be taken to maintain the location of the fracture in the required region. See, for example, the aforementioned Bailey et al. patent where heating is performed along the desired band of fracturing by electron beam bombardment and is followed by a subsequent quenching that produces a brittle frangible zone.

Other prior art references include U.S. Pat. Nos.: 1,931,585 Luton; 2,703,263 Zernov; 2,690,004 Crawford; 3,238,811 Longstreth; 3,580,106 Wiehl; 4,030,179 Schwarz; and 4,198,879 Hornak et al.

DISCLOSURE OF INVENTION

An object of the present invention is to improve the manufacturing of powdered-d metal multiple piece components. In carrying out this object, the invention involves both the process for performing the manufacturing and the resultant powdered metal component. The manufacturing involved has particular utility in making piston connecting rod assemblies including matched rods and caps, even though the invention is not: specifically limited in its broadest application to that type of component manufacturing.

In carrying out the above object and other objects of the invention, the process for manufacturing a multiple piece powdered metal component in accordance with the invention comprises initially forming a compacted and sintered powdered metal preform of the component with at least one slit that at least partially separates the pieces of the component. An antibonding agent is introduced into the slit. Forging of this preform to the final shape of the component closes the slit as the antibonding agent prevents complete bonding of the powdered metal pieces to each other to permit separation of the pieces from each other at the slit.

In one preferred practice of the process, the slit is formed to separate the pieces while leaving a limited amount of virgin powdered metal that connects the pieces to facilitate handling of the component after forging. This virgin powdered metal is subsequently machined away to separate the pieces from each other. Prior to this separation, at least one or both of the pieces may be machined at remote locations from the slit and the virgin powdered metal is then removed, which may be done by the machining, to separate the pieces from each other.

It is possible for the slit that separates the pieces of the powdered metal component to be formed with different shapes. In one version, the slit is formed with a planar shape which is the easiest shape to manufacture. In another version, the slit is formed with a nonplanar shape that is more difficult to manufacture but facilitates the subsequent positioning of the separated pieces with respect to each other upon reassembling for use.

The slit is also disclosed as completely separating the pieces from each other without any virgin powdered metal connecting the pieces.

One practice of the invention has the slit providing matched surfaces that are subsequently utilized to interfit the pieces with each other.

Another practice of the invention has the slit providing surfaces that are subsequently machined to provide engagement of the pieces with each other.

The manufacturing process of this invention has particular utility for use in manufacturing a two-piece piston connecting rod assembly including a connecting rod having a piston connecting end and also including a cap that cooperates with the rod to define a crankshaft connecting end. This piston connecting rod assembly manufacturing process initially forms a compacted and sintered powdered metal preform of the rod assembly with a pair of slits that at least partially separate the rod and cap. An antibonding agent is introduced into the pair of slits. Forging of the preform to the final shape of the rod assembly closes the slits as the antibonding agent prevents bonding of the rod and cap to each other to permit separation of the rod and cap from each other at the slits.

One preferred practice of the piston connecting rod assembly manufacturing process involves forming the slits so as to extend inwardly toward each other between the rod and cap and to have inner ends that terminate short of completely separating the rod and the cap so as to leave a limited amount of virgin powdered metal that connects the rod and cap. The rod and cap are then machined as necessary, which normally includes providing connection holes for connecting the rod and cap to each other. Thereafter, the rod and the cap are machined to remove the virgin powdered metal and separate the rod and the cap from each other. This machining that removes the virgin powdered metal also provides a crankshaft bearing surface.

The virgin powered metal for maintaining the forged pieces connected can be provided in different ways. In one practice of the invention, the piston connecting rod assembly manufacturing process is utilized to make a preform that is formed with a rough crankshaft bearing opening of a round shape in which a pair of lugs of the virgin powdered metal project inwardly at diametrically opposite locations respectively adjacent the pair of slits. In another version of the piston connecting rod assembly manufacturing process, the preform is formed with a rough crankshaft opening of a round shape from which the pair of slits are separated by the virgin powdered metal that connects the rod and cap.

Either of the previously mentioned versions of the process can be utilized to make the slits with either planar or nonplanar shapes at diametrically opposite locations from each other with respect to the crankshaft bearing opening of the preform. The forming of the slits with the planar shape is the easiest to perform and from that standpoint desirable, while the forming of the slits with the nonplanar shape is somewhat more difficult to perform but facilitates the subsequent positioning of the rod and cap with respect to each other upon connection after the initial separation.

Another preferred practice of the piston connecting rod manufacturing process is performed such that the pair of slits completely separates the rod and ca from each other.

The pair of slits are disclosed as providing matched surfaces that are subsequently utilized to interfit the rod and cap with each other.

The pair of slits is also disclosed as providing surfaces that are subsequently machined to provide engagement of the rod and cap with each other.

The manufacturing method is utilized to make a powdered metal component of the invention which includes a powdered metal forging having at least one slit that at least partially separates pieces of the forging and receives an antibonding agent that prevents bonding of the pieces so as to permit subsequent separation of the pieces from each other.

The powdered metal component in one embodiment is formed such that a limited amount of virgin powdered metal connects the pieces adjacent the slit to facilitate handling and further processing of the forging without premature separation of the pieces from each other.

In another embodiment, the powdered metal component is made such that the slit completely separates the pieces from each other.

After the separation of the pieces, the multiple piece powdered metal component according to one practice of the invention includes at least two forged pieces having matched surfaces that accurately interfit with each other. Each matched surface of the forging includes an antibonding agent which prevents complete bonding of the pieces to each other during the prior forging.

The invention has particular utility in the manufacturing of a powdered metal piston connecting rod assembly forging including a powdered metal forging of a connecting rod and cap at least partially separated by a pair of slits. Each of the slits receives an antibonding agent that prevents bonding of the connecting rod and cap to each other upon forging so as to permit subsequent separation of the connecting rod and cap from each other. One preferred embodiment of the rod assembly has the forging provided with a limited amount of virgin powdered metal connecting the rod and cap adjacent each slit to facilitate handling and further processing of the forging without premature separation of the connecting rod and cap. Another preferred embodiment of the rod assembly has the pair of slits completely separating the rod and cap from each other.

After separation of its pieces, the powdered metal piston connecting rod assembly of the invention includes a forged powdered metal connecting rod and a forged powdered metal cap which have matched surfaces that interfit with each other. Each matched surface includes an antibonding agent that prevents bonding of the connecting rod and cap to each other during forging thereof while permitting subsequent separation of the connecting rod and cap at the matched surface as well as subsequent securement to each other. One preferred embodiment of the rod assembly has the forging provided with a limited amount of virgin material adjacent each slit to facilitate handling and further processing of the connecting rod and cap to each other during connecting rod and cap. Another preferred embodiment of the rod assembly has the pair of slits completely separating the rod and cap from each other.

After separation of its pieces, the powdered metal piston connecting rod assembly of the invention includes a forged powdered metal connecting rod and a forged powdered metal cap which have matched surfaces that interfit with each other. Each matched surface includes an antibonding agent that prevents bonding of the connecting rod and cap &:o each other during forging thereof while permitting subsequent separation of the connecting rod and cap at the matched surface as well as subsequent securement to each other.

The objects, features, and advantages of the present invention are readily apparent from the following detailed description of the best modes for carrying out the invention when taken in connection with the accompanying drawings.

BRIEF DESCRIPTION OF DRAWINGS

FIG. 2 is a side view of a powdered metal piston rod assembly forging made in accordance with the invention with a limited amount of virgin powdered metal connecting a rod and cap of the assembly by inwardly projecting lugs within crankshaft opening adjacent planar slits that otherwise separate the rod and cap;

FIG. 3 is a partial view similar to FIG. 2 illustrating the rod and cap after separation from each other;

FIG. 4 is a partial view that illustrates one of the slits before separation of the pieces;

FIG. 5 is a partial view that illustrates the pieces after the separation;

BEST MODES FOR CARRYING OUT THE INVENTION

Figure 1:
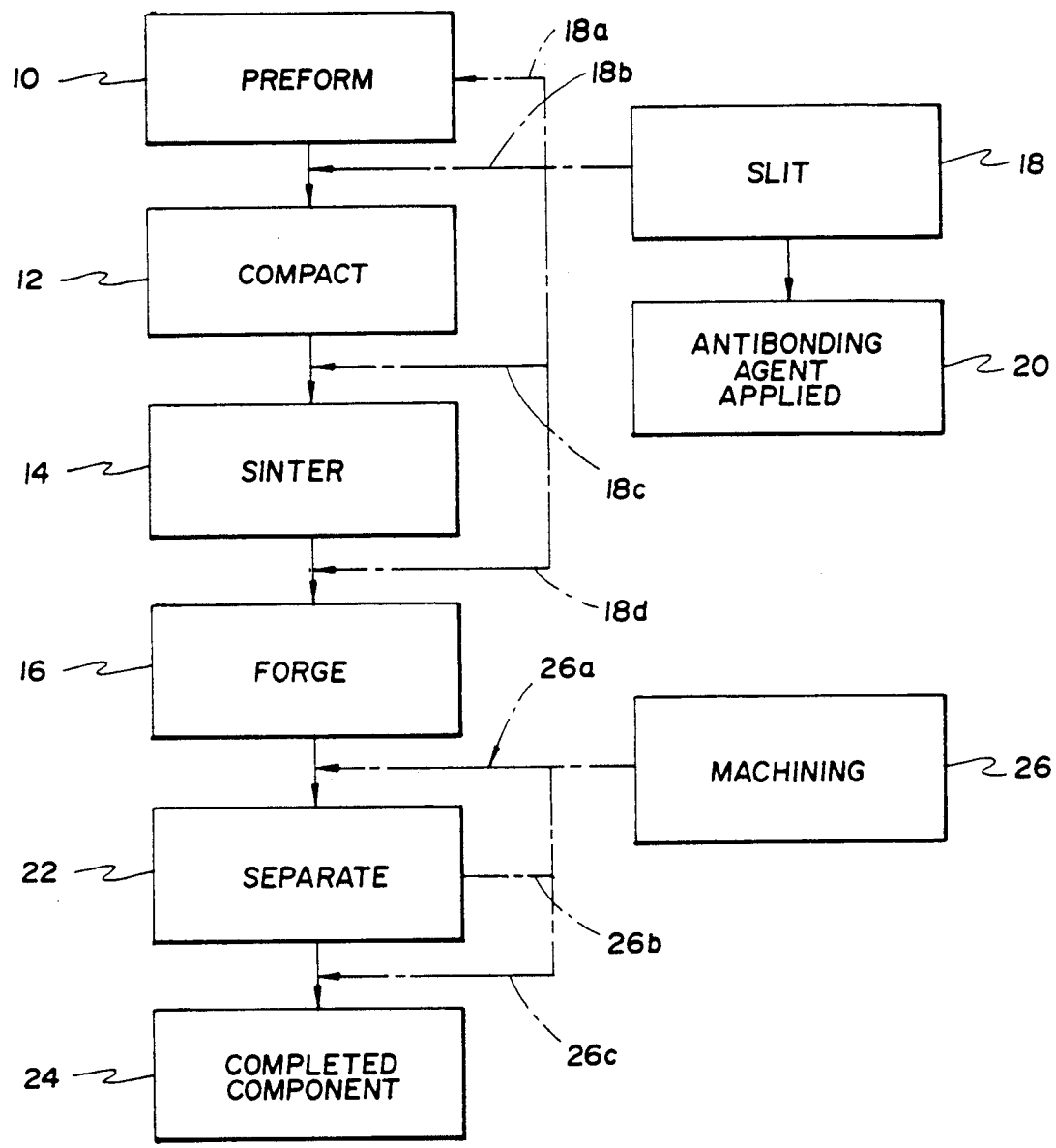
FIG. 1 is a diagrammatical view illustrating the manufacturing process of the invention for manufacturing powdered metal multiple piece components.

With reference to the drawings, a powdered metal manufacturing process is diagrammatically illustrated in FIG. 1 and has particular utility in manufacturing powdered metal piston connecting rod assembly forgings as illustrated in FIGS. 2 through 10. However, it should be understood that the invention is also applicable to the manufacturing of other multiple piece powdered metal components even though it does have particular utility in the manufacturing of piston connecting rod assemblies.

With reference to FIG. 1, the powdered metal manufacturing process of this invention is performed by an initial preform manufacturing step 10 that makes a powdered preform in a conventional manner prior to a compacting step 12 and a sintering step 14 all of which are performed conventionally prior to the normal forging step 16. Before the forging step 16, a slitting step 18 is performed followed by an application step 20 of an antibonding agent introduced into the slit in any suitable manner. The subsequent forging step 16 forges the sintered and compacted preform to the final shape of the component to close the slit as the antibonding agent prevents complete bonding of the powdered metal pieces to each other at the slit as is hereinafter more fully described. Consequently, the forged component can be easily separated as shown by step 22 into the pieces separated by the slit to provide the completion 24 of the component manufacturing. Machining as shown by step 26 can also be performed after the forging as is hereinafter more fully described.

With continuing reference to FIG. 1, the slitting operation 18 and application of the antibonding agent 20 can be performed at different stages and in different ways prior to the forging operation 16. It is possible to initially perform the slitting during the formation 10 of the preform as shown by path 18a. Such initial formation of the slit would require the use of a knife edge that defines the slit into which the antibonding agent is then introduced in order to complete the preform. Saw cutting, laser cutting, water jet cutting, and other suitable types of slit formation can also be subsequently utilized to provide the slit formation 18 prior to application of the antibonding agent. Such slit formation can be performed on the completed preform as shown by path 18b, after the compacting as shown by path 18c, or after the sintering as shown by path 18d.

Application of the antibonding agent as shown by step 20 in FIG. 1 after the formation of the slit can be performed in any suitable manner to prevent the rebonding of the powdered metal at the slit during the forging. A graphite and water mixture has been successfully utilized to prevent the rebonding. This graphite and water mixture is similar to currently utilized coatings that prevent adhering of the preform to the molds utilized during the compacting and forging steps. However, it should be appreciated that any antibonding agent that prevents the rebonding of the powdered metal at the slit upon forging can be utilized and is contemplated by the present invention.

As is hereinafter more fully described, the machining shown by step 26 can be performed at different stages after the forging. Specifically, the machining can be performed directly after the forging step 16 as shown by path 26a, as part of the separation step 22 as shown by path 26b, after the separation as shown by path 26c, or as a combination of two or more of these different stages of machining as may be required by the particular component being manufactured.

With reference to FIGS. 2 and 3, the powdered metal manufacturing process of this invention has particular utility as previously mentioned in making a multiple piece powdered metal piston connecting rod assembly 28 including a rod 30 and cap 32. This rod assembly 28 is initially manufactured as a sintered and compacted powdered metal preform as previously described and is provided with a piston connecting end 34 and another end 36 that cooperates with the cap 32 to provide the rod assembly with a crankshaft connecting end 38. Rod end 36 and cap 32 provide this crankshaft connecting end 38 with a rough crankshaft opening 40 of a round shape. A pair of slits 42 illustrated as having a planar shape are formed as previously described at the crankshaft connecting end 38 to at least partially separate the rod 30 and cap 32 at diametrically opposite locations with respect to the opening 40. After introduction of an antibonding agent 43 (FIG. 4) into the slits 42, the forging of the preform closes the slits while preventing rebonding of the powdered metal so as to easily permit the separation of the rod 30 and cap 32 as shown in FIG. 3.

As illustrated in FIG. 2, each slit 42 is preferably formed to separate the rod and cap pieces 30 and 32 with a pair of lugs 44 respectively adjacent the slits so as to thereby leave a limited amount of virgin powdered metal that connects the pieces to facilitate handling of the component after the forging step. The slits 42 thus extend inwardly toward each other between the rod and the cap and have inner ends that terminate short of completely separating the rod 30 and cap 32 as a result of the lugs 44 which leave some virgin powdered metal that connects the rod and the cap. The amount of the virgin powdered metal connecting the pieces must be sufficient to prevent separation during the handling and machining without being so great so as to adversely inhibit the separation of the pieces. Obviously this will depend upon the particular component being manufactured and the extent of the remaining powdered virgin metal thus cannot be defined exactly.

Both the rod 30 and the cap 32 are machined on opposite sides of the slits 42 to provide connection holes 46 as shown in FIG. 3. This machining is performed with the solid virgin powdered metal provided by lugs 44 maintaining the rod 30 and cap 32 positioned with respect to each other. Each connection hole 46 is machined to include a spot facing 48 for seating an associated connection cap bolt (not shown) and also includes an unthreaded cap hole portion 50 and a threaded rod hole portion 52. These hole portions 50 and 52 are accurately located with respect to each other as a result of the machining of the connection holes 46 with the rod and cap connected by the virgin powdered metal of the lugs 44 prior to the separation.

Removal of the lugs 44 by machining separates the rod 30 and cap 32 to define the matched rod and cap surfaces 54 and 56 at which the antibonding agent prevents the rebonding during the initial forging. These matched surfaces 54 and 56 as shown in FIG. 5 have the antibonding agent 43 penetrated into the metal along the generally planar configuration of each surface that earlier formed the slit 42. During the removal of the lugs 44 by machining, a crankshaft bearing surface 58 can also be machined within the rough crankshaft opening 40 with semicircular portions of the surface 58 defined by both the rod 30 and cap 32. Since the slits 42 are closed by the forging step even though rebonding of the powdered metal does not occur due to the use of the antibonding agent 43, the semicircular portions of the crankshaft bearing surface 58 are accurately located with respect to each other in defining a completely round shape upon reconnection of the rod 30 and cap 32 by cap bolts torqued into the connection holes 46 with the matched rod and cap surfaces 54 and 56 engaged with each other.

Figure 6:
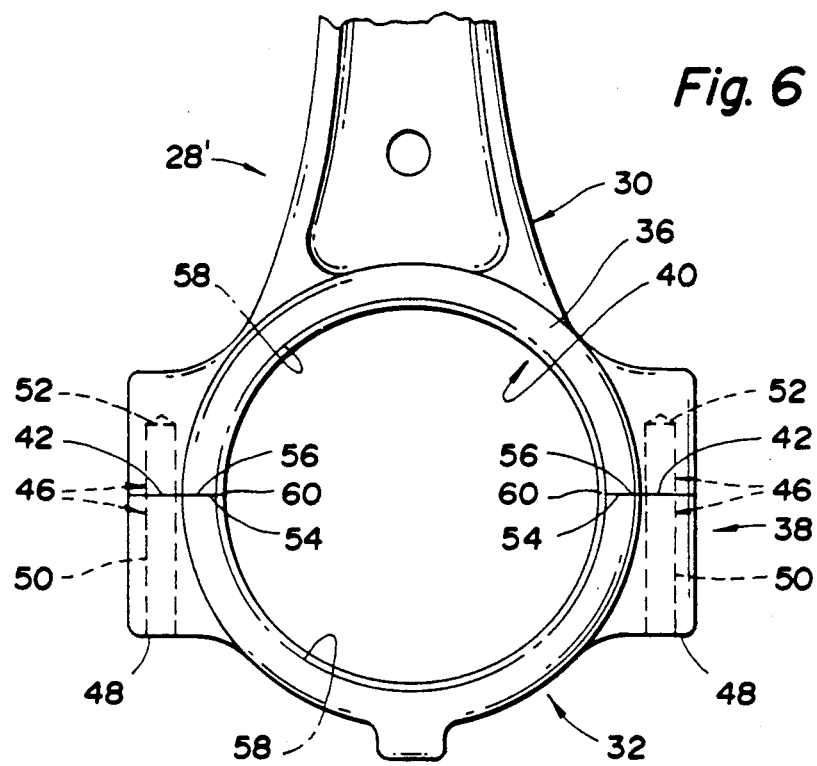
FIG. 6 is a partial view similar to FIG. 2 of another embodiment wherein the planar slits terminate short of the crankshaft opening to thereby provide the virgin powdered metal that connects the rod and cap to each other.
Figure 7:
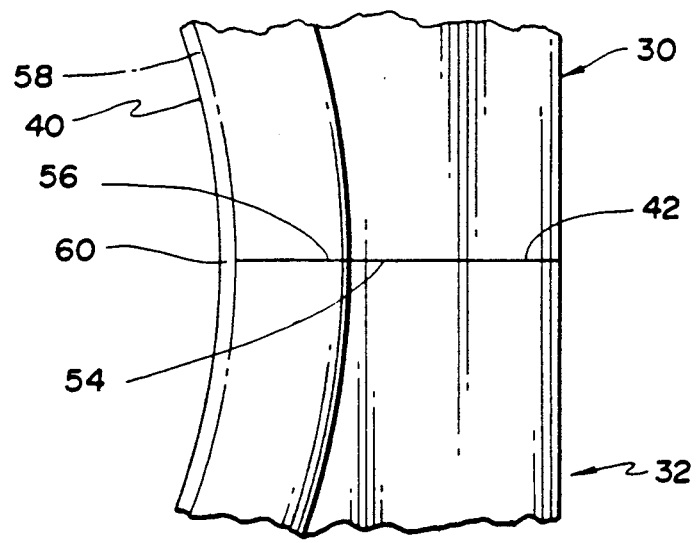
FIG. 7 is an enlarged view of a portion of FIG. 6 illustrating the virgin powdered metal that connects the rod and cap to each other.

With reference to FIG. 6, another embodiment of the rod assembly 28' is manufactured the same as the previously described embodiment except as will be noted such that the prior description is applicable and need not be repeated. This embodiment of the rod assembly 28' has its rod 30 and cap 32 formed with a rough crankshaft opening 40 of a round shape from which the inner ends of the pair of slits 42 are separated by virgin powdered metal 60 that connects the rod and the cap. With this embodiment, the subsequent machining to provide the crankshaft bearing surface 58 on both the rod 30 and cap 32 removes the solid virgin material 60 (FIG. 7) adjacent the inner ends of the slits 42 so as to separate the rod and the cap after the machining of the connection holes 46 as previously described.

Both the embodiment 28 of the rod assembly illustrated in FIGS. 2 and 3 and the embodiment 28' of the rod assembly illustrated in FIG. 6 have the slits 42 provided with planar shapes which is the easiest shape to make from a manufacturing standpoint and thus desirable. As previously mentioned, these slits 42 are located at diametrically opposite location with respect to the crankshaft opening 40 and are generally coplanar with each other passing through the central asix of the crankshaft opening.

Figure 8:
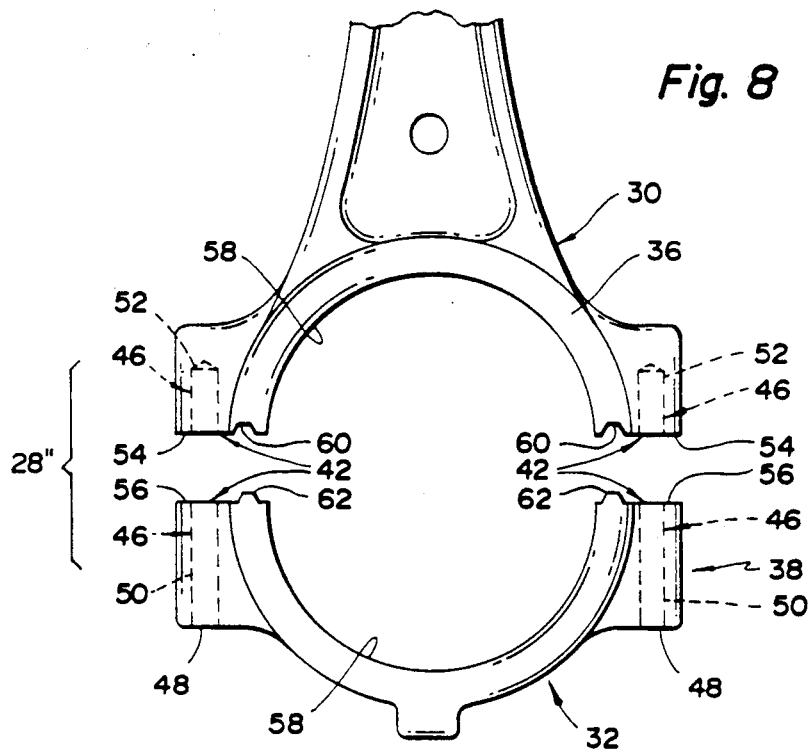
FIG. 8 is a view similar to FIG. 3 of another embodiment after separation of the rod and the cap but with slits provided with nonplanar matches surfaces that facilitate the subsequent repositioning of the rod and the cap with respect to each other upon connection for use.

Another embodiment of the rod assembly 28" illustrated in FIG. 8 has its slits 42 provided with nonplanar shapes such that the matched rod and cap surfaces 54 and 56 interfit with each other. Specifically, each rod surface 54 is illustrated as having a depression 60 and each cap surface 56 is illustrated as having a projection 62 that is received by the associated depression 60 upon engagement of the matched rod and cap surfaces with each other. Such interfitting of the nonplanar rod and cap surfaces 54 and 56 facilitates the positioning of the rod 30 and cap 32 with respect to each other. These nonplanar rod and cap surfaces 54 and 56 are somewhat more difficult to manufacture than the planar surfaces provided by the planar slits illustrated by the embodiment of FIGS. 2 and 3 and the embodiment of FIG. 6; however, such difficulty in manufacturing may be warranted for certain applications of piston connecting rod assemblies and other components in view of the ease in repositioning of the surfaces with respect to each other upon connection of the rod to the cap. Also, it should be mentioned that the embodiment 28", of the rod assembly can be manufactured either as previously described in connection with the embodiment of FIGS. 2 and 3 with inwardly extending lugs 44 providing the virgin powdered metal or as previously described in connection with the embodiment of FIG. 6 wherein the slits 42 terminate short of the rough crankshaft opening 40 and have the virgin powdered metal 60 that connect the rod and the cap prior to separation. Otherwise, the preceding description is also applicable to this embodiment of FIG. 7 and need not be repeated.

Figure 9:
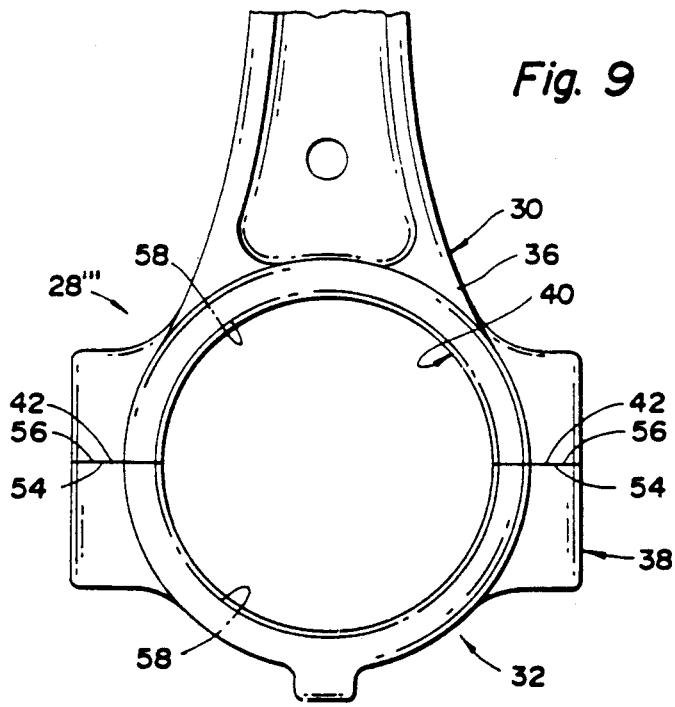
FIG. 9 is a view of a further embodiment with slits that completely separate the rod and cap with respect to each other.

A further embodiment of the rod assembly 28''' is illustrated in FIG. 9 as having slits 42 that completely separate the rod 30 and cap 32. Thus, the antibonding agent that is introduced into the slits prevents complete rebonding between the rod 30 and cap 32 over the entire area between those components. The rod 30 and cap 32 after the forging are thus held together only by any minimal amount of partial bonding that takes place. As such, separation between the rod 30 and cap 32 is facilitated with the slits 42 providing such complete separation.

Figure 10:
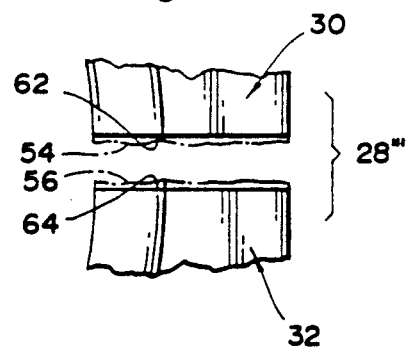
FIG. 10 is an enlarged partial view that illustrates the manner in which the opposed surfaces of the rod and cap can be machined after the separation.

As illustrated in FIG. 10, after the separation of the rod 30 and cap 32, the fractured surfaces 54 and 56 can be machined to provide machined surfaces 62 and 64. While these surfaces 62 and 64 are preferably planar as illustrated, it is also possible for the machine surfaces to have nonplanar shapes as illustrated in FIG. 8.

While the best modes for carrying out the invention have been described in detail, those familiar with the art to which this invention relates will recognize various alternative processes and embodiments for practicing the invention as described by the following claims

What is claimed is:

1. A process for manufacturing a multiple piece powdered metal component, comprising: forming a compacted and sintered powdered metal preform of the component with at least one predetermined slit that separates the pieces of the component along a predetermined nonfractured interface; introducing an antibonding agent into the slit; and forging the preform to the final shape of the component as the antibonding agent prevents complete bonding of the powdered metal pieces to each other to permit separation of the pieces from each other without fracturing the powdered metal pieces except at the predetermined slit.

2. A process as in claim 1 wherein the slit is formed to separate the pieces while leaving a limited amount of virgin powdered metal that connects the pieces to facilitate handling of the component after the forging.

3. A process as in claim 2 wherein the virgin powdered metal is subsequently machined away to separate the pieces from each other.

4. A process as in claim 2 wherein at least one of the pieces is machined at a location remote from the slit and the virgin powdered metal thereafter being removed to separate the pieces from each other.

5. A process as in claim 1 wherein the slit is formed with a planar shape.

6. A process as in claim 1 wherein the slit is formed with a nonplanar shape.

7. A process as in claim 1 wherein the slit completely separates the pieces of the component.

8. A process as in claim 1 wherein the pieces are separated from each other at the slit which provides matched surfaces that are subsequently utilized interfit the pieces with each other.

9. A process as in claim 1 wherein the pieces are separated from each other at the slit which provides surfaces that are subsequently machined to provide engagement of the pieces with each other.

10. A process for manufacturing a two-piece piston connecting rod assembly including a connecting rod having a piston connecting end and also including a cap that cooperates with the rod to define a crankshaft connecting end, the process comprising: forming a compacted and sintered powdered metal preform of the rod assembly with a pair of slits that at least partially separates the rod and cap along a pair of predetermined nonfractured interfaces; introducing an antibonding agent into the slits; and forging the preform to the final shape of the rod assembly as the antibonding agent prevents bonding of the rod and cap to each other to permit separation of the pieces from each other without fracturing the pieces except at the slits.

11. A process as in claim 10 wherein the slits are formed to extend inwardly toward each other between the rod and cap and have inner ends that terminate short of completely separating the rod and cap so as to leave a limited amount of virgin powdered metal that connects the rod and cap.

12. A process as in claim 11 wherein the rod and cap are machined to provide connection holes for providing connection to each other, and the rod and cap thereafter being machined to remove the virgin powdered metal and separate the rod and cap from each other.

13. A process as in claim 12 wherein the machining that removes the virgin powdered metal material also provides a crankshaft bearing surface.

14. A process as in claim 13 wherein the preform of the rod assembly is formed with a rough crankshaft bearing opening of a round shape in which a pair of lugs of the virgin powdered metal project inwardly at diametrically opposite locations respectively adjacent the pair of slits.

15. A process as in claim 13 wherein the preform of the rod assembly is formed with a rough crankshaft opening of a round shape from which the pair of slits are separated by the virgin powdered metal that connects the rod and cap.

16. A process as in claim 13 wherein the preform of the rod assembly is formed with a rough crankshaft bearing opening of a round shape and the pair of slits being formed with planar shapes located diametrically opposite each other with respect to the crankshaft bearing opening.

17. A process as in claim 13 wherein the preform of the rod assembly is formed with a rough crankshaft bearing opening of a round shape and the pair of slits being formed with nonplanar shapes located diametrically opposite each other with respect to the crankshaft bearing opening.

18. A process as in claim 10 wherein the pair of slits completely separate the rod and cap from each other.

19. A process as in claim 10 wherein the rod and cap are separated from each other at the pair of slits which provide matched surfaces that are subsequently utilized to interfit the rod and cap with each other.

20. A process as in claim 10 wherein the rod and cap are separated from each other at the pair of slits which provide surfaces that are subsequently machined to provide engagement of the rod and cap with each other.

* * * * *